(12) United States Patent
Liu et al.

(10) Patent No.: US 9,485,819 B2
(45) Date of Patent: Nov. 1, 2016

(54) SINGLE STAGE LED DRIVER SYSTEM, CONTROL CIRCUIT AND ASSOCIATED CONTROL METHOD

(71) Applicant: Chengdu Monolithic Power Systems Co., Ltd., Chengdu (CN)

(72) Inventors: Bairen Liu, Hangzhou (CN); Qiming Zhao, Hangzhou (CN); Licheng Sheng, Hangzhou (CN); Bo Yu, Hangzhou (CN); Hongqiang Qin, Hangzhou (CN); Eric Yang, Saratoga, CA (US)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 0 days.

(21) Appl. No.: 14/603,245

(22) Filed: Jan. 22, 2015

(65) Prior Publication Data

US 2015/0208472 A1 Jul. 23, 2015

(30) Foreign Application Priority Data

Jan. 22, 2014 (CN) .......................... 2014 1 0028803

(51) Int. Cl.
*H05B 33/08* (2006.01)

(52) U.S. Cl.
CPC ......... *H05B 33/0815* (2013.01); *Y02B 20/346* (2013.01)

(58) Field of Classification Search
CPC .. H02M 3/156; H02M 3/158; H02M 3/1588; H02M 3/33507; H02M 1/32; H02M 1/36; H02M 2001/0003; H02M 2001/0025; H05B 33/0815; H03K 17/20; H03K 17/30; H03K 2017/307; H03K 5/19; H03K 17/063
See application file for complete search history.

(56) References Cited

U.S. PATENT DOCUMENTS

| | | | |
|---|---|---|---|
| 2011/0227493 A1 | 9/2011 | Du et al. | |
| 2012/0153866 A1* | 6/2012 | Liu | H02M 3/33561 315/294 |
| 2012/0194078 A1* | 8/2012 | Ren | H05B 33/0887 315/122 |
| 2013/0077358 A1* | 3/2013 | Gaknoki | H02M 3/33507 363/21.17 |

* cited by examiner

*Primary Examiner* — Monica C King

(57) ABSTRACT

A light-emitting element driver system has a power conversion circuit, a second switch and a control circuit, the power conversion circuit has a primary circuit, a transformer, a first rectified circuit and a second rectified circuit, the second rectified circuit provides a first signal, the second switch has a first terminal coupled to an output terminal of the first rectified circuit and a second terminal to provide a second signal, when a dimming signal is in a first state, the control circuit provides a first control signal to control the power conversion circuit based on the first signal, and meanwhile provides a second control signal to control the second switch based on the second signal.

12 Claims, 13 Drawing Sheets

SINGLE STAGE LED DRIVER SYSTEM, CONTROL CIRCUIT AND ASSOCIATED CONTROL METHOD

CROSS-REFERENCE TO RELATED APPLICATION(S)

This application claims the benefit of CN application No. 201410028803.8, filed on Jan. 22, 2014, and incorporated herein by reference.

TECHNICAL FIELD

The present invention relates to electrical circuit, more particularly but not exclusively relates to light-emitting element.

BACKGROUND

With development of electronic technology, light-emitting diode (LED) is widely used in application of general illumination market and display market per smaller, easier driver and higher efficiency. Currently, LED driver system typically uses a three-stage circuit structure. A precise current is needed for LED driving, and other voltage power supplies, for example, 12V and/or 5V, are also needed for powering other circuits of LED driver system.

There are several kinds of structures for LED driver system, for example, multi-stage LED driver system with voltage converters and LED driver circuit. As shown in FIG. 1, a conventional three-stage LED driver system 100 comprises a power factor correction (PFC) stage 11, an isolated DC/DC converter stage 12, an isolated DC/DC converter stage 13, and a LED driver stage 14. Isolated DC/DC converter 13 is used to provide DC voltage power supplies, 12V and 5V. Isolated DC/DC converter 12 is used to provide power for LED driver stage 14. LED driver stage 14 is used to drive a LED Panel. It is obviously that conventional three-stage LED driver system 100 is complex, low efficiency and has high cost and large size.

SUMMARY

It is one of the objects of the present invention to provide light-emitting element driver system, control circuit and associated control method to resolve one or more technical problems.

One embodiment of the present invention discloses a light-emitting element driver system, comprising: a power conversion circuit, configured to provide a first signal, wherein the power conversion circuit comprising: a primary circuit, comprising a first switch, the primary circuit is configured to provide an AC signal; a transformer, comprising a primary winding, a first secondary winding and a second secondary winding, the primary winding is coupled to the primary circuit to receive the AC signal; a first rectified circuit, coupled to the first secondary winding and having an output terminal; a second rectified circuit, coupled to the second secondary winding and having an output terminal configured to provide the first signal; a second switch, having a first terminal and a second terminal, wherein the first terminal is coupled to the output terminal of the first rectified circuit and the second terminal is configured to provide a second signal; and a control circuit, configured to provide a first control signal to control the power conversion circuit and a second control signal to control the second switch; wherein when a dimming signal is in a first state, the first signal is regulated by turning ON and turning OFF the first switch, meanwhile the second signal is regulated by turning ON and turning OFF the second switch.

Another embodiment of the present invention discloses a control circuit for a light-emitting element driver system, wherein the light-emitting element driver system having a power conversion circuit and a switch, wherein the power conversion circuit having a first output terminal configured to provide a first signal and a second output terminal, the switch having a first terminal coupled to the second output terminal of the power conversion circuit and a second terminal configured to provide a second signal, and wherein the control circuit comprising: a first compensation circuit, configured to provide a first compensation signal based on the first signal and a first reference; a second compensation circuit, configured to provide a second compensation signal based on the second signal and a second reference; a frequency generating circuit, configured to receive the first compensation signal and provide a first control signal to control the power conversion circuit based on the first compensation signal; and a pulse generating circuit, configured to receive the second compensation signal and provide a second control signal to control the switch based on the second compensation signal.

Yet another embodiment of the present invention discloses a method for driving a light-emitting element, comprising: receiving an input signal and converting to provide a first signal at a first output terminal of a power conversion circuit; coupling a switch to a second output terminal of the power conversion circuit, and providing a second signal through the switch; and regulating the first signal to a first reference via controlling the power conversion circuit, and meanwhile regulating the second signal to a second reference via turning ON and turning OFF the switch; and wherein at least one of the first signal and the second signal is used to drive the light-emitting element.

In one embodiment, a light-emitting element driver system with a simple structure is disclosed. The light-emitting element driver system regulates the first signal and the second signal at the same time. With embodiments of the present invention, it is flexible to achieve high signal precision for both the first signal and the second signal meanwhile with simple structure and low cost.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to LED driver system, control circuit and associated control method. As used hereinafter, the term "couple" generally refers to multiple ways including a direct connection with an electrical conductor and an indirect connection through intermediate diodes, resistors, capacitors, and/or other intermediaries. LED driver system is taken as one example hereinafter, but one of ordinary skill in the art should understand that any other light-emitting element may be adopted, such as CCFL, WLED and so on. One of ordinary skill in the art should also understand that term "LED" used hereinafter indicates single LED, LED string, multiple LEDs coupled in series or parallel, and any other suitable configuration using LED/LEDs.

Figure 1:
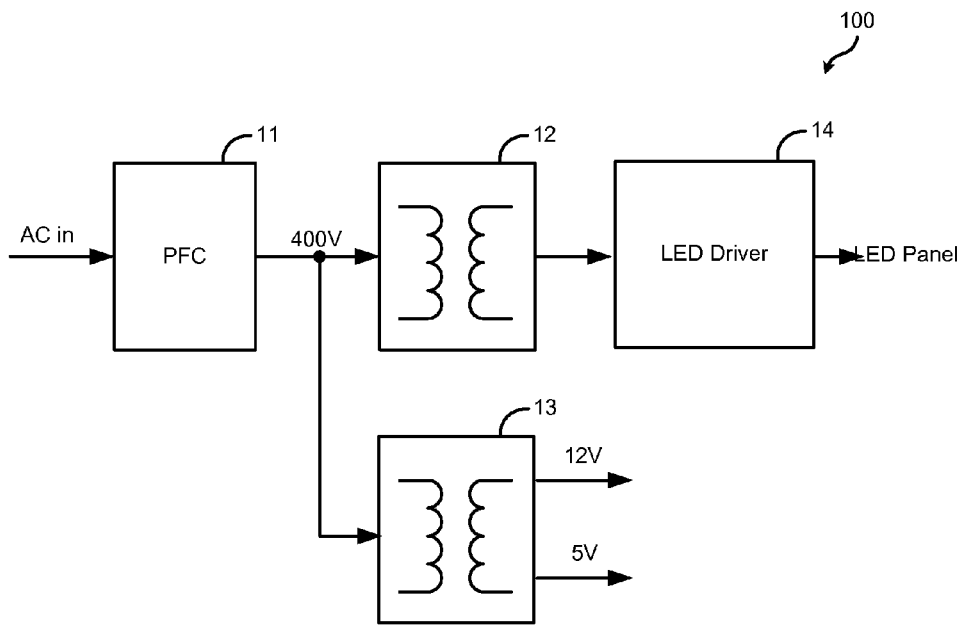
FIG. 1 illustrates a conventional three-stage LED driver system 100.
Figure 2A:
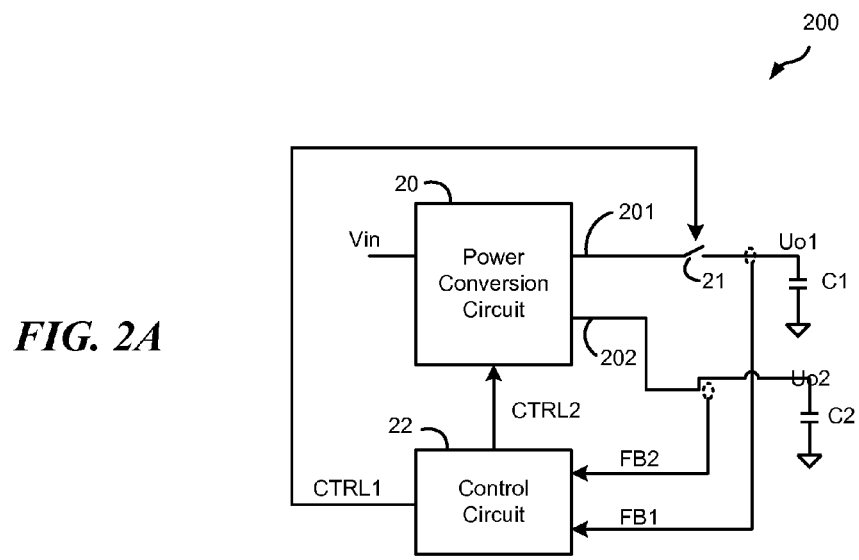
FIG. 2A schematically illustrates a circuit block diagram of a LED driver system 200 according to an embodiment of the present invention.

FIG. 2A schematically illustrates a circuit block diagram of a LED driver system 200 according to an embodiment of the present invention. As shown in FIG. 2A, LED driver system 200 comprises a power conversion circuit 20, a switch 21 and a control circuit 22. Power conversion circuit 20 is configured to receive an input signal Vin and provide a signal Uo2 at an output terminal 202, switch 21 is coupled to an output terminal 201 of power conversion circuit 20 to provide a signal Uo1. Signal Uo1 is regulated by switch 21, and meanwhile, signal Uo2 is regulated by power conversion circuit 20. Input signal Vin may be provided by a PFC circuit or any other suitable power supply circuit. Power conversion circuit 20 may employ any current type topology, such as LLC resonant converter, flyback converter, BOOST converter, Buck-Boost converter and so on. Power conversion circuit 20 may use any suitable control method, such as PWM (Pulse Width Modulation) control, PFM (Pulse Frequency Modulation) control, etc. Control mode of power conversion circuit 20 may be peak current control, average current control, hysteresis control, etc. Signal Uo1 and/or signal Uo2 may be either a current signal or a voltage signal. Switch 21 may be any suitable semiconductor switching device, such as Metal Oxide Semiconductor Field Effect Transistor (MOSFET), Insulated Gate Bipolar Translator (IGBT) and so on. In the embodiment shown in FIG. 2A, LED driver system 200 is configured to regulate signal Uo1 and signal Uo2 by control circuit 22. Control circuit 22 is configured to receive a feedback signal FB1 representing signal Uo1 and a feedback signal FB2 representing signal Uo2, and is configured to provide a control signal CTRL1 to control switch 21 and provide a control signal CTRL2 to control power conversion circuit 20. Switch 21 is turned ON and turned OFF by control signal CTRL1 to regulate signal Uo1 to a first reference. The power conversion circuit 20 is controlled by control signal CTRL2 to regulate signal Uo2 to a second reference. In one embodiment, control circuit 22 is configured to provide control signal CTRL1 based on signal Uo1 and provide control signal CTRL2 based on signal Uo2. Signal Uo1 or signal Uo2 may be used to drive a LED, or any other light-emitting element, such as WLED or CCFL. Hereinafter will take the LED as examples, but one of ordinary skill in the art should understand that any other light-emitting element may be driven by signal Uo1 or signal Uo2.

Figure 2B:
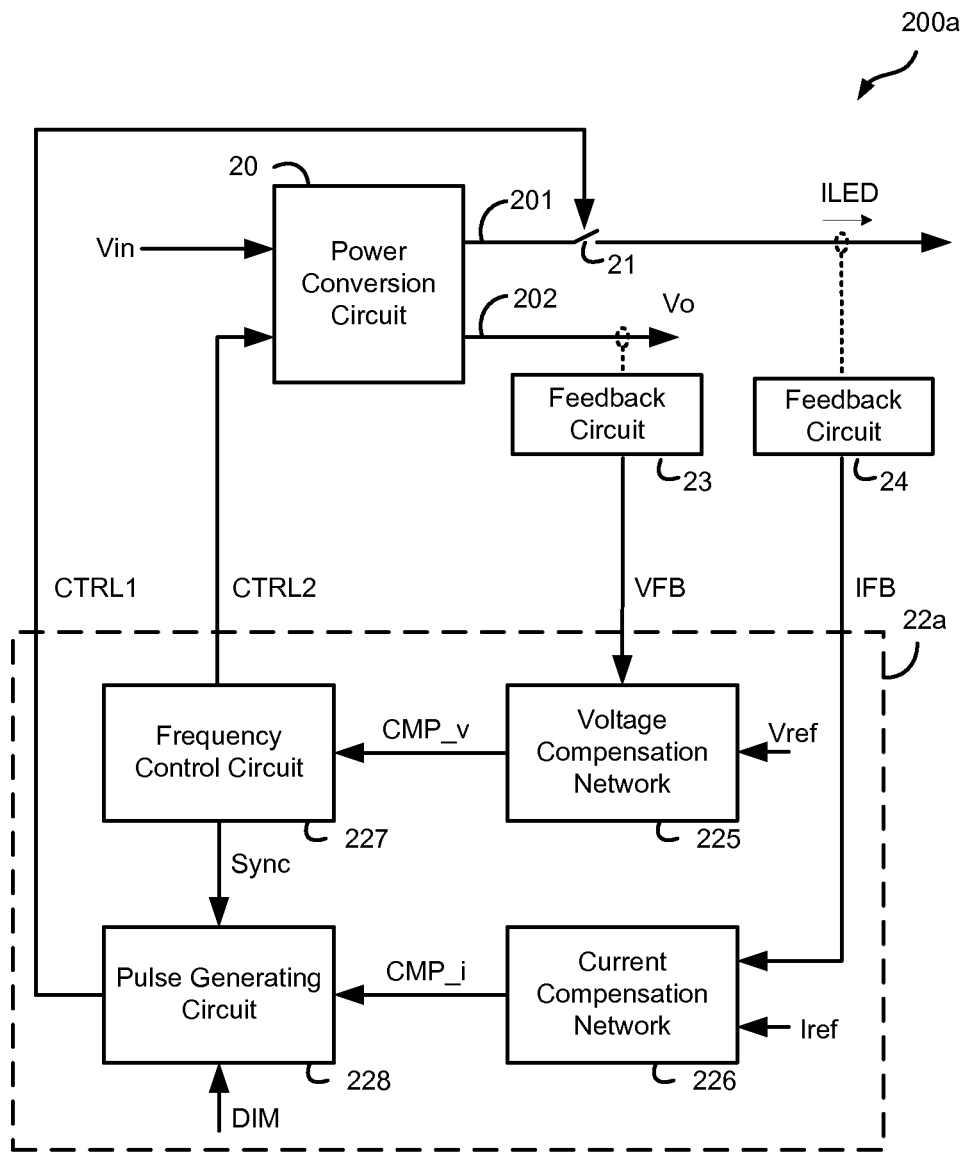
FIG. 2B schematically illustrates a circuit block diagram of a LED driver system 200a according to an embodiment of the present invention.

FIG. 2B schematically illustrates a circuit block diagram of a LED driver system 200a according to an embodiment of the present invention. LED driver system 200a comprises power conversion circuit 20, switch 21 and a control circuit 22a. Power conversion circuit 20 is configured to receive input signal Vin and provide a voltage signal Vo at output terminal 202. Switch 21 is coupled to output terminal 201 of power conversion circuit 20 to provide a current signal ILED. Control circuit 22a is configured to control switch 21 to regulate current signal ILED to a current reference, and control circuit 22a is configured to control power conversion circuit 20 to regulate voltage signal Vo to a voltage reference.

In one embodiment, LED driver system 200a further comprises a feedback circuit 23 and a feedback circuit 24. Feedback circuit 23 is configured to sense voltage signal Vo and provide voltage feedback signal VFB. Feedback circuit 24 is configured to sense current signal ILED and provide current feedback signal IFB. Feedback circuit 23 and/or feedback circuit 24 may comprise resistor divider, capacitor divider, transformer, Hall sensor or any other suitable circuit.

In the embodiment shown in FIG. 2B, LED driver system 200a is configured to regulate both voltage signal Vo and current signal ILED at the same time by control circuit 22a. Control circuit 22a is configured to control power conversion circuit 20 to regulate voltage signal Vo, meanwhile control circuit 22a is configured to control switch 21 to regulate current signal ILED. Control circuit 22a is configured to receive voltage feedback signal VFB and current feedback signal IFB, and provide control signal CTRL1 to control switch 21 and control signal CTRL2 to control power conversion circuit 20. Referring to FIG. 2B, control circuit 22a comprises a current compensation network 226, a voltage compensation network 225, a frequency control circuit 227 and a pulse generating circuit 228. Current compensation network 226 is configured to receive current feedback signal IFB and is configured to provide a current compensation signal CMP_i via comparing current feedback signal IFB with a current reference signal Iref. Voltage compensation network 225 is configured to receive voltage feedback signal VFB and is configured to provide a voltage compensation signal CMP_v via comparing voltage feedback signal VFB with a voltage reference signal Vref.

Frequency control circuit 227 is configured to receive voltage compensation signal CMP_v and is configured to provide control signal CTRL2 based on voltage compensation signal CMP_v. Pulse generating circuit 228 is configured to receive current compensation signal CMP_i and is configured to provide control signal CTRL1 based on current compensation signal CMP_i.

In one embodiment, a dimming signal DIM is employed and pulse width modulation (PWM) dimming method may be used to adjust a luminance of the LED. When dimming signal DIM is in a first state, e.g., high voltage level, current signal ILED is positive to supply power to drive the LED; and when dimming signal DIM is in a second state, e.g., low voltage level, power supplied to the LED is cut off and current signal ILED is almost zero ampere. In the embodiment shown in FIG. 2B, pulse generating circuit 228 is further configured to receive dimming signal DIM. Pulse generating circuit 228 is configured to provide control signal CTRL1 to turn ON and turn OFF switch 21 periodically based on current compensation signal CMP_i when dimming signal DIM is in the first state, and switch 21 maintains OFF when dimming signal DIM is in the second state. Dimming signal DIM may be generated by control circuit 22a or may be provided by other circuit.

In one embodiment, frequency control circuit 227 is further configured to provide a synchronous signal Sync, for example, based on control signal CTRL2. Pulse generating circuit 228 is further coupled to frequency control circuit 227 to receive synchronous signal Sync and is configured to provide control signal CTRL1 to switch 21 based on current compensation signal CMP_i and synchronous signal Sync. In one embodiment, switch 21 is turned ON based on current compensation signal CMP_i and switch 21 is turned OFF based on synchronous signal Sync. In one embodiment, a frequency of control signal CTRL1 is related with a frequency of control signal CTRL2, for example, the frequency of control signal CTRL1 equals to the frequency of control signal CTRL2.

Figure 2C:
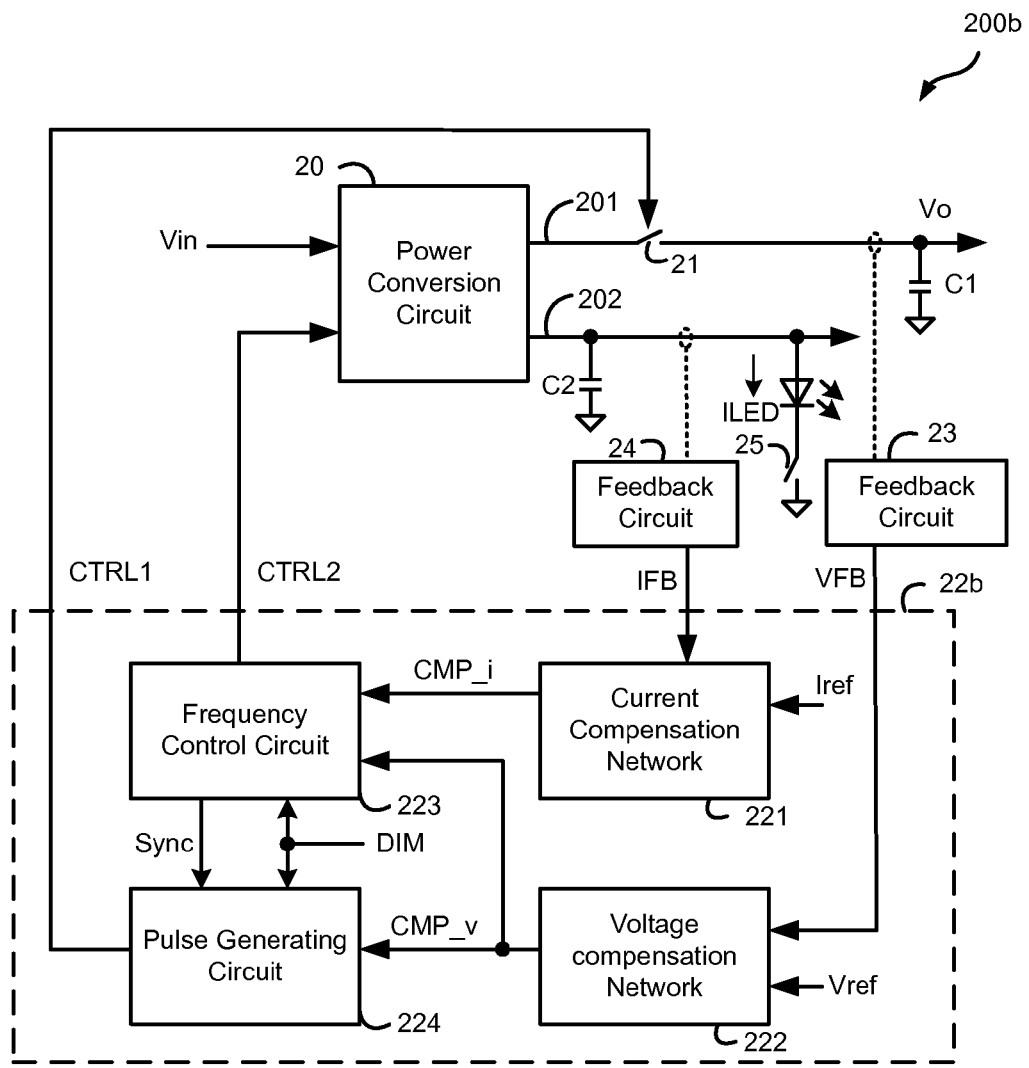
FIG. 2C schematically illustrates a circuit block diagram of a LED driver system 200b according to another embodiment of the present invention.

FIG. 2C schematically illustrates a circuit block diagram of a LED driver system 200b according to another embodiment of the present invention. LED driver system 200b comprises power conversion circuit 20, switch 21 and a control circuit 22b. Power conversion circuit 20 is configured to receive input signal Vin and provide current signal ILED at output terminal 202. Switch 21 is coupled to output terminal 201 of power conversion circuit 20 to provide voltage signal Vo. Control circuit 22b is configured to control switch 21 to regulate voltage signal Vo to a voltage reference, e.g., 5V, meanwhile control circuit 22b is configured to control power conversion circuit 20 to regulate current signal ILED to a current reference, e.g., 200 mA.

In one embodiment, LED driver system 200b further comprises feedback circuit 23 and feedback circuit 24. Feedback circuit 23 is configured to sense voltage signal Vo and provide voltage feedback signal VFB. Feedback circuit 24 is configured to sense current signal ILED and provide current feedback signal IFB.

In the embodiment shown in FIG. 2C, voltage signal Vo and current signal ILED are regulated by control circuit 22b at the same time. Control circuit 22b is configured to regulate current signal ILED via controlling power conversion circuit 20, and meanwhile control circuit 22b is configured to regulate voltage signal Vo via controlling switch 21. Control circuit 22b is configured to receive voltage feedback signal VFB and current feedback signal IFB, and is configured to provide control signal CTRL1 and control signal CTRL2. In the embodiment shown in FIG. 2C, control circuit 22b comprises a current compensation network 221, a voltage compensation network 222, a frequency control circuit 223 and a pulse generating circuit 224. Current compensation network 221 is configured to receive current feedback signal IFB and is configured to provide current compensation signal CMP_i via comparing current feedback signal IFB with current reference signal Iref. Voltage compensation network 222 is configured to receive voltage feedback signal VFB and is configured to provide voltage compensation signal CMP_v via comparing voltage feedback signal VFB with voltage reference signal Vref. Frequency control circuit 223 is configured to receive current compensation signal CMP_i and voltage compensation signal CMP_v, and is configured to provide control signal CTRL2 to control power conversion circuit 20 based on current compensation signal CMP_i and voltage compensation signal CMP_v. Pulse generating circuit 224 is configured to receive voltage compensation signal CMP_v, and is configured to provide control signal CTRL1 to control switch 21 based on voltage compensation signal CMP_v.

In one embodiment, dimming signal DIM is employed and pulse width modulation (PWM) dimming method may be used to adjust the luminance of the LED. When dimming signal DIM is in the first state, a switch 25 is turned ON and power is supplied to drive the LED; and when dimming signal DIM is in the second state, switch 25 is turned OFF, power supplied to the LED is cut off, and current signal ILED is almost zero ampere. In one embodiment, frequency control circuit 223 is further configured to receive dimming signal DIM, and pulse generating circuit 224 is further configured to receive dimming signal DIM. When dimming signal DIM is in the first state, frequency control circuit 223 is configured to provide control signal CTRL2 to control power conversion circuit 20 based on current compensation signal CMP_i, and pulse generating circuit 224 is configured to provide control signal CTRL1 to control switch 21 based on voltage compensation signal CMP_v. And when dimming signal DIM is in the second state, switch 21 maintains ON, and frequency control circuit 223 is configured to provide control signal CTRL2 to control power conversion circuit 20 based on voltage compensation signal CMP_v. Dimming signal DIM may be generated by control circuit 22b, or may be provided by other circuit.

In one embodiment, frequency control circuit 223 is further configured to provide synchronous signal Sync, and pulse generating circuit 224 is further configured to receive synchronous signal Sync and provide control signal CTRL1 to control switch 21 based on voltage compensation signal CMP_v and synchronous signal Sync. In one embodiment, switch 21 is turned ON based on voltage compensation signal CMP_v and switch 21 is turned OFF based on synchronous signal Sync. In one embodiment, the frequency of control signal CTRL1 is related with the frequency of control signal CTRL2.

As described foregoing, embodiments shown in FIGS. 2a-2c are preferred for cost and simple architecture to achieve precise regulation of two signals at the same time, e.g., regulate both current signal ILED and voltage signal V_bus at the same time.

Figure 3:
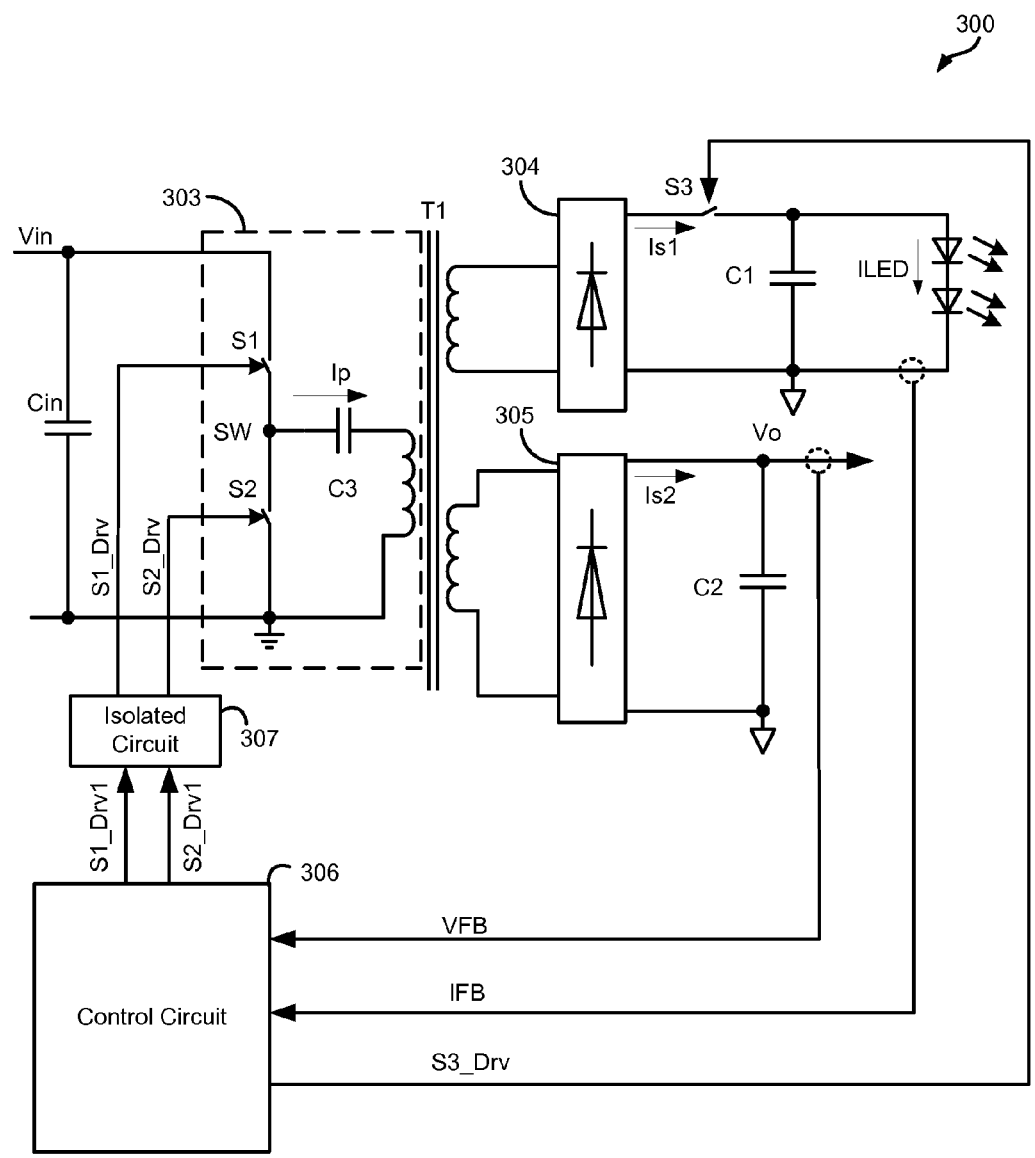
FIG. 3 schematically illustrates a LED driver system 300 according to an embodiment of the present invention.

FIG. 3 schematically illustrates a LED driver system 300 according to an embodiment of the present invention. LED driver system 300 comprises a power conversion circuit configured as a LLC topology, comprising a primary circuit 303, a transformer T1, a rectified circuit 304 and a rectified circuit 305. LED driver system 300 further comprises a control circuit 306, an isolated circuit 307, an input capacitor Cin, an output capacitor C1, an output capacitor C2 and a switch S3. Transformer T1 comprises a primary winding coupled to primary circuit 303, a first secondary winding coupled to rectifier circuit 304 and a second secondary winding coupled to rectifier circuit 305. Primary circuit 303 comprises at least one switch. Referring to FIG. 3, primary circuit 303 adopts LLC resonant topology, comprising a switch S1, a switch S2 and a capacitor C3. Primary circuit 303 is configured to receive input signal Vin through input capacitor Cin. Switch S1 and switch S2 are turned ON and OFF to provide an AC signal to the primary winding of transformer T1. A primary current Ip flows through capacitor C3, a secondary current Is1 flows through rectified circuit 304, and a secondary current Is2 flows through rectified circuit 305. One of ordinary skill in the art should appreciate that switch S1 and switch S2 may be metal oxide semiconductor field effect transistor ("MOSFET"). The MOSFET may be either N type or P type. Other types of switches such as bipolar junction transistor ("BJT") or junction field effect transistor ("JFET") can also be employed. One of ordinary skill in the art should appreciate that other suitable topologies of primary circuit 303, e.g., Flyback circuit may also be used without detracting from the merits of present invention.

Rectified circuit 304 is coupled to the first secondary winding of transformer T1 and is configured to provide current signal ILED to the LED through switch S3. Rectified circuit 305 is coupled to the second secondary winding of transformer T1 and is configured to provide voltage signal Vo as a bus voltage. Rectified circuit 304 and/or rectified circuit 305 may be a half-wave rectified circuit or a full-wave rectified circuit. Output capacitor C1 is coupled to outputs of rectified circuit 304 and output capacitor C2 is coupled to outputs of rectified circuit 305. Switch S3 is coupled between rectified circuit 304 and capacitor C1.

Control circuit 306 is coupled to primary circuit 303 and is configured to provide a driving signal S1_Dry to control switch S1 and a driving signal S2_Dry to control switch S2 based on voltage feedback signal VFB, and provide a driving signal S3_Dry to switch S3 based on current feedback signal IFB. As shown in FIG. 3, control circuit 306 is placed at a secondary side of transformer T1, an isolated circuit 307 is coupled between control circuit 306 and primary circuit 303, i.e., control circuit 306 is coupled to primary circuit 303 through isolated circuit 307. Control circuit 306 is configured to provide driving signal S1_Dry and driving signal S2_Dry through isolated circuit 307. In one embodiment, switch S1 and switch S2 are turned ON and turned OFF alternately. Isolated circuit 307 may comprise transformer or photo-coupler. In other embodiments, control circuit 306 may be placed at a primary side of transformer T1, and an isolated circuit may be coupled between control circuit 306 and the secondary side of transformer T1.

In one embodiment, switch S3 maintains OFF to cut off power supplied to the LED when dimming signal DIM is in the second state, and switch S3 is turned ON and OFF periodically to regulate current signal ILED when dimming signal DIM is in the first state. In one embodiment, when rectified circuit 304 or the LED has any fault, switch S3 is turned OFF to cut off power supplied to output capacitor C1 by rectified circuit 304. Fault of rectified circuit 304 comprises over voltage or over current, and fault of the LED comprises open circuit or short circuit. In one embodiment, when switch S3 is turned OFF, primary circuit 303 and second secondary circuit 305 works normally. In one embodiment, when second secondary circuit 305 has any fault, primary circuit 303 is OFF and LED driver system 300 stops working.

Figure 4:
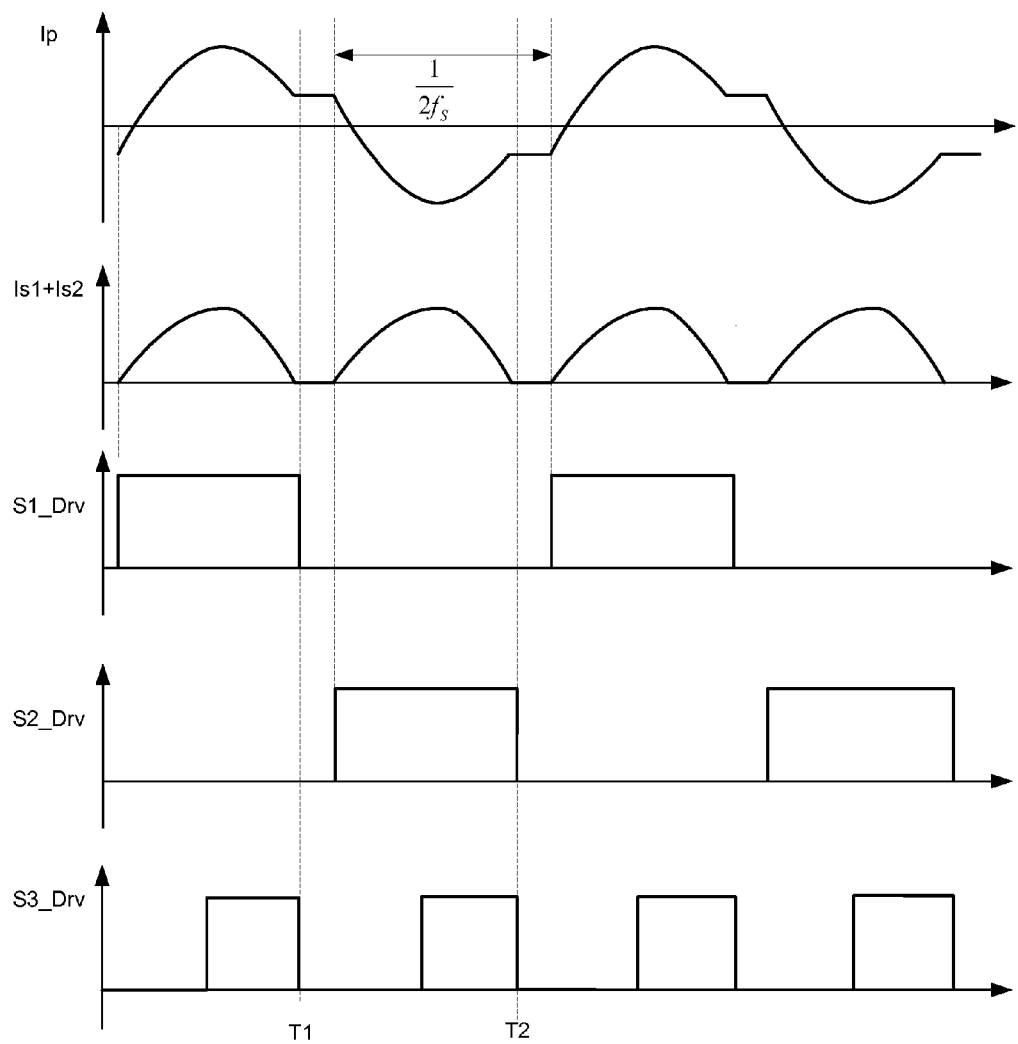
FIG. 4 shows waveforms of LED driver system 300 shown in FIG. 3 according to an embodiment of the present invention.

FIG. 4 shows waveforms of LED driver system 300 shown in FIG. 3 according to an embodiment of the present invention. Driving signals S1_Drv, S2_Dry and S3_Dry are high voltage level effective signals. A switching frequency fs of switch S1 and switch S2 is less than a resonant frequency fr of LLC resonant circuit. FIG. 4 shows primary current Ip, a summation of secondary current Is1+Is2, driving signal S1_Drv, driving signal S2_Dry and Driving signal S3_Drv. As shown in FIG. 4, switch S1 and switch S2 are configured to be turned ON alternately by complementary driving signals S1_Dry and S2_Drv. There is a dead time period between driving signals S1_Dry and S2_Dry to avoid shoot-through of switch S1 and switch S2, and during the dead time period, both switches S1 and S2 are turned OFF. In one embodiment, switch S3 is turned ON based on current feedback signal IFB and switch S3 is turned OFF based on driving signals S1_Dry and S2_Drv. Referring to FIG. 4, at time T1, driving signal S1_Dry becomes ineffective, i.e., low voltage level, to turn OFF switch S1, then driving signal S3_Dry becomes ineffective, i.e., low voltage level, to turn OFF switch S3, and summation of secondary current Is1+Is2 is almost zero ampere, as a result, switch S3 is easy to achieve zero-current switching off. At time T2, driving signal S2_Dry becomes ineffective, i.e., low voltage level, to turn off switch S2, then driving signal S3_Dry becomes ineffective to turn off switch S3, and summation of secondary current Is1+Is2 is almost zero ampere, as a result, switch S3 is easy to achieve zero-current switching off. It is simple to achieve zero-current switching off for switch S3 that switch S3 is turned OFF when switch S1 or switch S2 is turned OFF, and switching loss and voltage stress on switch S3 are reduced accordingly. When switch S1 or switch S2 is turned OFF, summation of secondary current Is1+Is2 is almost zero ampere, rectified circuit 304 and rectified circuit 305 is off with zero-current, and as a result power loss caused by a current flowing through a leakage inductance of secondary windings is eliminated.

Figure 5:
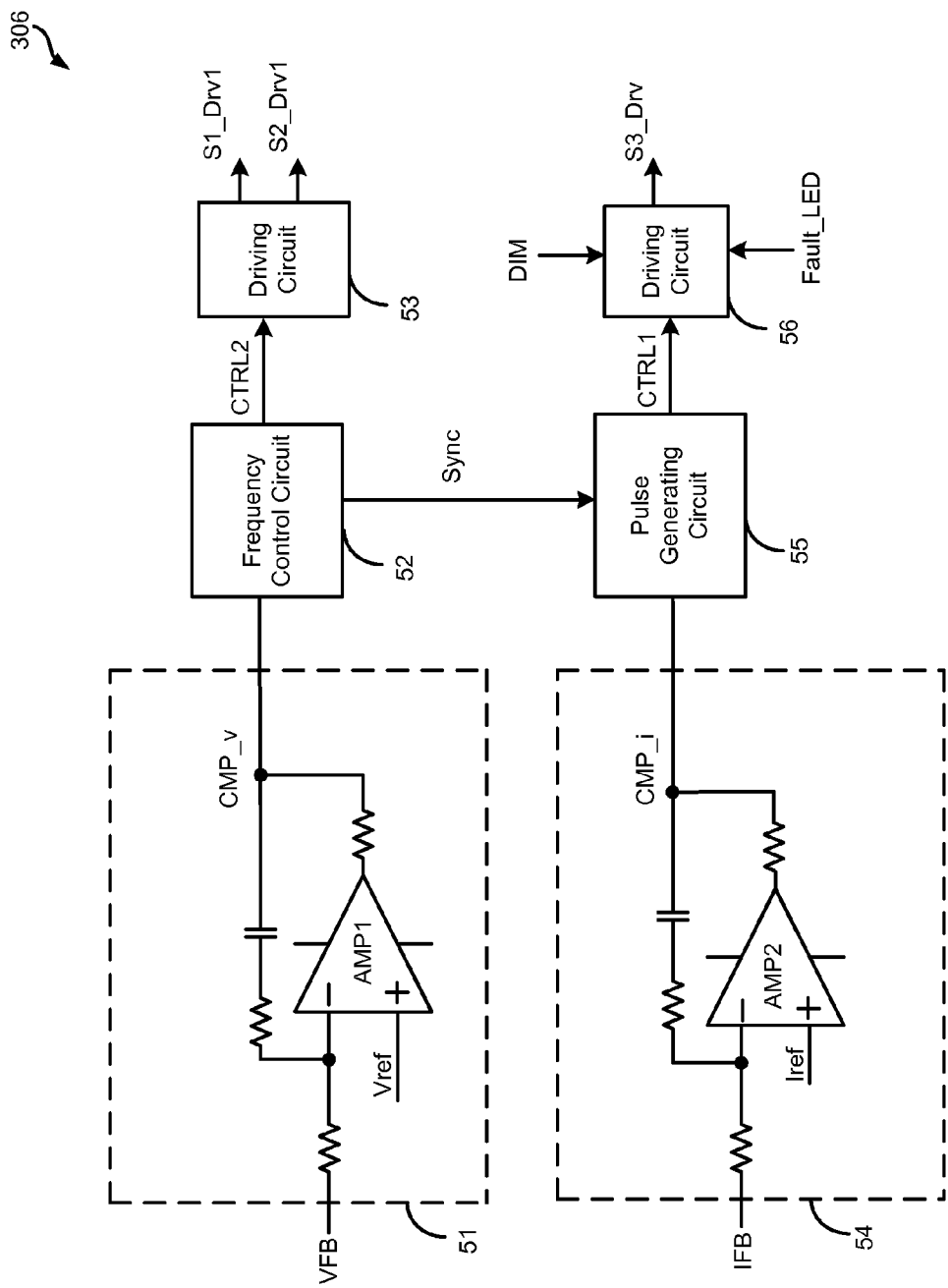
FIG. 5 schematically illustrates control circuit 306 according to an embodiment of the present invention.

FIG. 5 schematically illustrates control circuit 306 according to an embodiment of the present invention. Control circuit 306 comprises a voltage control loop and a current control loop, wherein the voltage control loop comprises a voltage compensation network 51 and a frequency control circuit 52, and wherein the current control loop comprises a current compensation network 54 and a pulse generating circuit 55. The voltage control loop is configured to provide control signal CTRL2 to control switch S1 and switch S2 based on voltage feedback signal VFB, and the current control loop is configured to provide control signal CTRL1 to control switch S3 based on current feedback signal IFB. Voltage compensation network 51 is configured to provide voltage compensation signal CMP_v by comparing voltage feedback signal VFB with voltage reference signal Vref. Frequency control circuit 52 is configured to provide control signal CTRL2 based on voltage compensation signal CMP_v. Frequency control circuit 52 may use pulse frequency modulation. In one embodiment, frequency control circuit 52 is configured to regulate switching frequency fs of switch S1 and switch S2 based on voltage compensation signal CMP_v, e.g., switching frequency fs of switch S1 and switch S2 increases when compensation signal CMP_v increases. In one embodiment, a capacitor is charged by voltage compensation signal CMP_v, and frequency control circuit 52 is configured to adjust switching frequency fs of switch S1 and switch S2 based on a voltage across the capacitor. In one embodiment, driving signal S1_Dry and driving signal S2_Dry have a fixed duty cycle, such as 50%. One of ordinary skill in the art should also appreciate that any other suitable modulation method may also be used. In one embodiment, frequency control circuit 52 is configured to provide synchronous signal Sync to pulse generating circuit 55 based on control signal CTRL2. In one embodiment, synchronous signal Sync becomes high voltage level when control signal CTRL2 becomes low voltage level. Based on control signal CTRL2, driving circuit 53 is configured to provide driving signal S1_Drv1 to switch S1 and driving signal S2_Drv2 to switch S2. Current compensation network 54 is configured to receive current feedback signal IFB and is configured to provide current compensation signal CMP_i through comparing current feedback signal IFB with current reference signal Iref. In one embodiment, pulse generating circuit 55 is configured to turn ON switch S3 based on current compensation signal CMP_i and turn OFF switch S3 based on a status of switch S1 or a status of switch S2, e.g., turn OFF switch S3 when one of switch S1 and switch S2 is turned OFF. In one embodiment, pulse generating circuit 55 is configured to provide control signal CTRL1 to switch S3 based on current compensation signal CMP_i and synchronous signal Sync. In one embodiment, pulse generating circuit 55 is configured to turn ON switch S3 based on current compensation signal CMP_i and is configured to turn OFF switch S3 based on synchronous signal Sync. In one embodiment, synchronous signal Sync becomes effective to turn OFF switch S3 when one of switch S1 and switch S2 is turned OFF. Driving circuit 56 is configured to provide driving signal S3_Drv to switch S3 based on control signal CTRL1. In one embodiment, driving circuit 56 is configured to receive dimming signal DIM, driving signal S3_Drv is configured to turn ON and turn OFF switch S3 periodically when dimming signal DIM is in the first state, and driving signal S3_Drv is configured to maintain switch S3 OFF when dimming signal DIM is in the second state. In one embodiment, driving circuit 56 is configured to receive fault signal Fault_LED. Driving signal S3_Drv is configured to turn switch S3 OFF when fault signal Fault_LED indicates that rectified circuit 304 or the LED has any fault.

Continuing with FIG. 5, voltage compensation network 51 comprises an amplifier AMP1 comprising a non-inverting terminal, an inverting terminal and an output terminal, wherein the non-inverting terminal of amplifier AMP1 is configured to receive voltage reference signal Vref, the inverting terminal of amplifier AMP1 is configured to receive voltage feedback signal VFB, and the output terminal of amplifier AMP1 is configured to provide voltage compensation signal CMP_v via comparing voltage feedback signal VFB with voltage reference signal Vref. Frequency control circuit 52 is configured to provide control signal CTRL2 to adjust switching frequency fs of switch S1 and switch S2. Current compensation network 54 comprises amplifier AMP2 comprising a non-inverting terminal, an inverting terminal and an output terminal, wherein the non-inverting terminal of amplifier AMP2 is configured to receive current reference signal Iref, the inverting terminal of amplifier AMP2 is configured to receive current feedback signal IFB, and the output terminal of amplifier AMP2 is configured to provide current compensation signal CMP_i via comparing current feedback signal IFB with current reference signal Iref. Pulse generating circuit 55 is configured to provide control signal CTRL1 to regulate a duty cycle of switch S3 based on current compensation signal CMP_i. In one embodiment, a switching frequency of switch S3 equals twice of switching frequency fs of switch S1 or switch S2.

Figure 6:
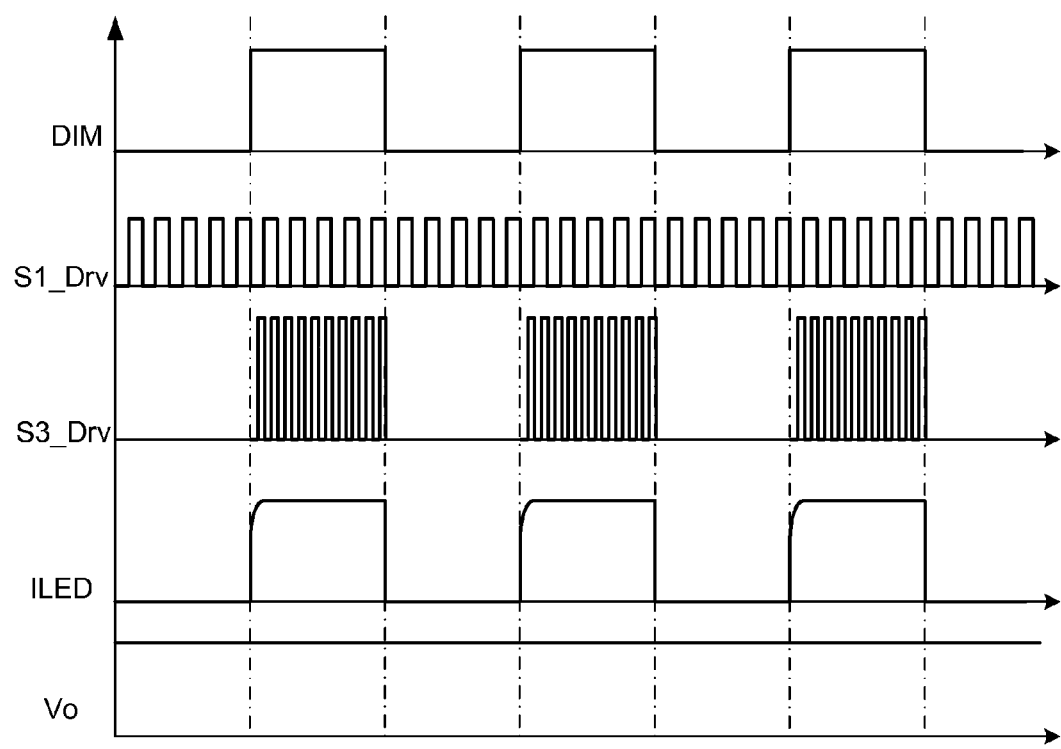
FIG. 6 shows waveforms of control circuit 306 shown in FIG. 5 according to an embodiment of the present invention.

FIG. 6 shows waveforms of control circuit 306 shown in FIG. 5 according to an embodiment of the present invention. FIG. 6 shows dimming signal DIM, driving signal S1_Drv, driving signal S3_Drv, Current signal ILED and voltage signal Vo, wherein dimming signal DIM, driving signal S1_Dry and driving signal S3_Dry are high voltage level effective signals. When dimming signal DIM is high voltage level, i.e., effective, driving signal S3_Dry is configured to turn ON and turn OFF switch S3 periodically, and when dimming signal DIM is low voltage level, i.e., ineffective, driving signal S3_Dry maintains low voltage level to keep switch S3 turned OFF, LLC resonant circuit 303 stops providing power to the LED and current signal ILED is almost zero ampere. Driving signal S1_Dry is configured to turn ON and turn OFF switch S1 and driving signal S2_Dry (not shown in FIG. 6) is configured to turn ON and turn OFF switch S2 to regulate voltage signal Vo.

Figure 7:
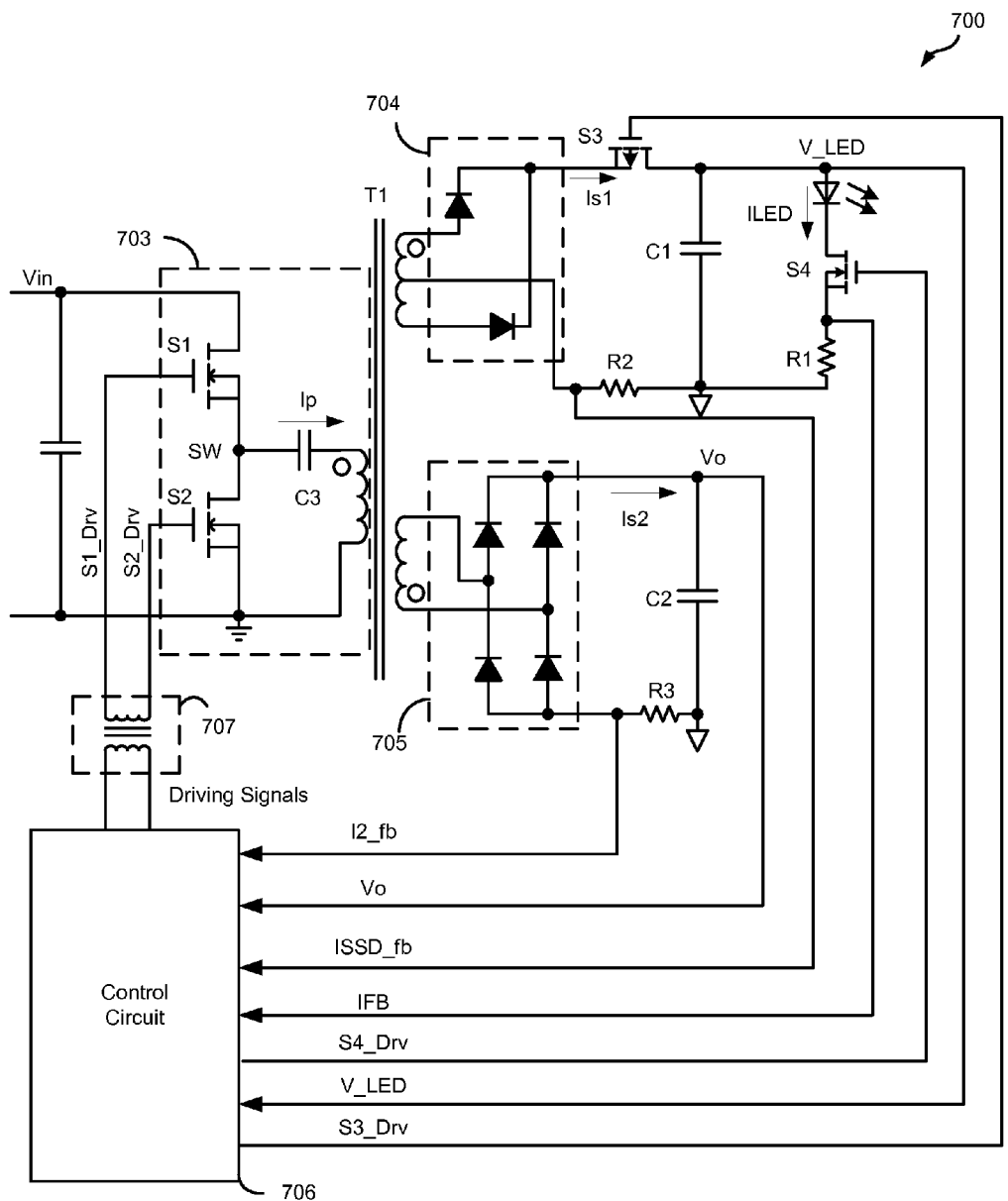
FIG. 7 schematically illustrates a LED driver system 700 according to an embodiment of the present invention.

FIG. 7 schematically illustrates a LED driver system 700 according to an embodiment of the present invention. The structure of LED driver system 700 is similar with LED driver system 300 shown in FIG. 3. LED driver system 700 comprises a primary circuit 703, a transformer T1, a rectified circuit 704, a rectified circuit 705, a control circuit 706 and an isolated circuit 707. Rectified circuit 704 comprises a full-wave rectified circuit and rectified circuit 705 comprises a full-bridge rectified circuit. In one embodiment, switch S1 comprises an N type MOSFET, and switch S2 comprises an N type MOSFET. In one embodiment, switch S3 comprises a P type MOSFET. In one embodiment, a switch S4 comprising an N type MOSFET is employed for protection and/or dimming. Control circuit 706 is configured to receive a voltage V_LED representing an output voltage across capacitor C1, a current feedback signal ISSD_fb representing an output current of rectified circuit 704, current feedback signal IFB representing a current flowing through the LED, output voltage Vo of rectified circuit 705, a current feedback signal I2_fb representing an output current of rectified circuit 705, and control circuit 706 is configured to provide driving signals to control switch S1 and switch S2 through isolated circuit 707. Control circuit 706 is further configured to provide driving signal S3_Dry to control switch S3 and a driving signal S4_Dry to control switch S4. In one embodiment, isolated circuit 707 comprises a transformer. In other embodiment, isolated circuit 707 may comprise a photo-coupler.

Figure 8:
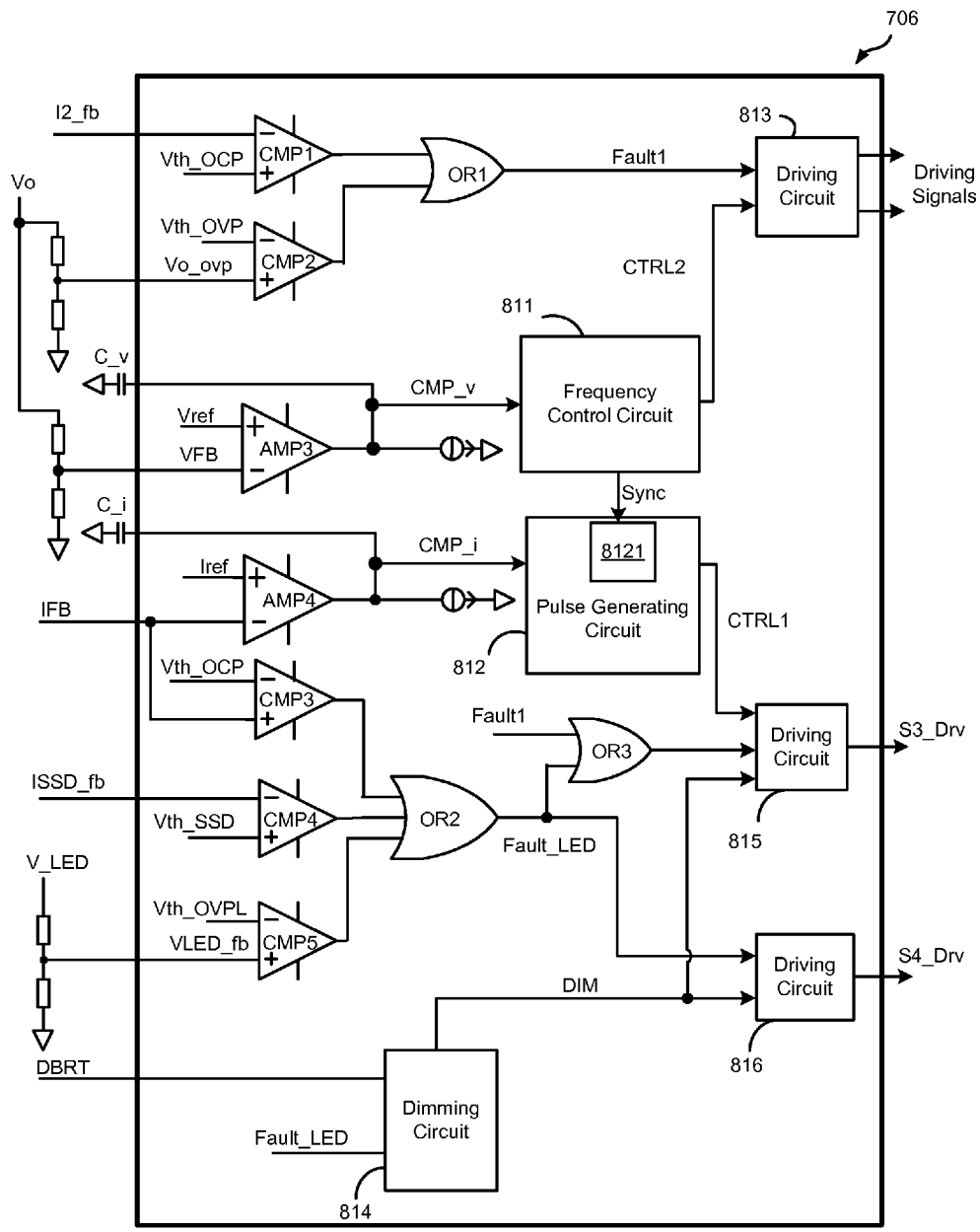
FIG. 8 schematically illustrates a detailed control circuit 706 according to an embodiment of the present invention.

Control circuit 706 may be integrated on an IC (integrated circuit). FIG. 8 schematically illustrates a detailed control circuit 706 according to an embodiment of the present invention. Control circuit 706 comprises a frequency control circuit 811, a pulse generating circuit 812, a driving circuit 813, a dimming circuit 814, a driving circuit 815, and a driving circuit 816. Control circuit 706 is configured to provide driving signals to switch S1 and switch S2. Control circuit 706 is further configured to provide driving signal S3_Dry to switch S3 and driving signal S4_Dry to switch S4. In one embodiment, voltage feedback signal VFB is provided based on voltage signal Vo through a resistor divider, and a signal Vo_ovp is provided based on voltage signal Vo through another resistor divider. A signal VLED_fb is provided based on voltage V_LED through a resistor divider. Control circuit 706 is configured to provide a short circuit protection or an over current protection for rectified circuit 705 by a comparator CMP1, wherein comparator CMP1 comprises an inverting terminal configured to receive current feedback signal I2_fb, a non-inverting terminal configured to receive a threshold signal Vth_OCP, and an output terminal. Control circuit 706 is configured to provide an over voltage protection for rectified circuit 705 by a comparator CMP2, wherein comparator CMP2 comprises an inverting terminal configured to receive a threshold signal Vth_OVP, a non-inverting terminal configured to receive signal Vo_ovp and an output terminal. An OR gate OR1 comprises a first input terminal coupled to the output terminal of comparator CMP1, a second input terminal coupled to the output terminal of comparator CMP2 and an output terminal configured to provide a fault signal Fault1 to indicate that if there is a fault condition happened on rectified circuit 705.

An amplifier AMP3 comprises an inverting terminal coupled to voltage feedback signal VFB, a non-inverting terminal coupled to voltage reference signal Vref, and an output terminal configured to provide voltage compensation signal CMP_v. An amplifier AMP4 comprises an inverting terminal coupled to current feedback signal IFB, a non-inverting terminal coupled to current reference signal Iref, and an output terminal configured to provide current compensation signal CMP_i. Frequency control circuit 811 is configured to provide control signal CTRL2 for controlling switch S1 and switch S2 based on voltage compensation signal CMP_v. Frequency control circuit 811 is further configured to provide synchronous signal Sync based on voltage compensation signal CMP_v or based on control signal CTRL2. Pulse generating circuit 812 is configured to provide control signal CTRL1 for controlling switch S3 based on current compensation signal CMP_i and synchronous signal Sync. In one embodiment, pulse generating circuit 812 is configured to turn ON switch S3 based on current compensation signal CMP_i, and configured to turn OFF switch S3 based on synchronous signal Sync. In one embodiment, pulse generating circuit 812 further comprises a synchronous circuit 8121 configured to control a switching frequency of switch S3 based on synchronous signal Sync, e.g., the switching frequency of switch S3 is double of switching frequency fs of switch S1 or switch S2.

Control circuit 706 is configured to provide an over current protection for the LED by a comparator CMP3, where current feedback signal IFB is coupled to a non-inverting terminal of comparator CMP3, and a threshold signal Vth_OCP is coupled to an inverting terminal of comparator CMP3. When an over current fault condition happens on the LED, an output of comparator CMP3 is configured to trigger a fault signal FAULT_LED to indicate the fault condition, e.g., FAULT_LED becomes high voltage level. Control circuit 706 is configured to provide an over current protection for rectified circuit 704 by a comparator CMP4, where current feedback signal ISSD_fb is coupled to an inverting terminal of comparator CMP4, and a threshold signal Vth_SSD is coupled to a non-inverting terminal of comparator CMP4. When an over current fault condition happens on rectified circuit 704, an output of comparator CMP4 is configured to trigger fault signal FAULT_LED to indicate the fault condition, e.g., FAULT_LED becomes high voltage level. Control circuit 706 is configured to provide an over voltage protection for rectified circuit 704 by a comparator CMP5. In one embodiment, voltage V_LED is divided by a resistor divider and then a voltage feedback signal VLED_fb is provided accordingly. Voltage feedback signal VLED_fb is coupled to a non-inverting terminal of comparator CMP5, and a threshold signal Vth_OVPL is coupled to an inverting terminal of comparator CMP5. When an over voltage fault condition happens on rectified circuit 704, an output of comparator CMP5 is configured to trigger fault signal FAULT_LED to indicate the fault condition, e.g., FAULT_LED becomes high voltage level. An OR gate OR2 is configured to provide fault signal FAULT_LED in accordance with the output of comparator CMP3, the output of comparator CMP4 and the output of comparator CMP5.

Driving circuit 813 is configured to provide driving signals for switch S1 and switch S2 in accordance with fault signal Fault1 and control signal CTRL2. When fault signal Fault1 indicates that a fault happened on rectified circuit 705, driving signals become ineffective to turn OFF switch S1 and switch S2. Otherwise, when fault signal Fault1 indicates that there is no fault condition happened on rectified circuit 705, driving circuit 813 is configured to provide driving signals in accordance with control signal CTRL2. Driving circuit 815 is configured to provide driving signal S3_Drv to switch S3 in accordance with fault signal Fault1, fault signal Fault_LED, dimming signal DIM and control signal CTRL1. When fault signal Fault1 indicates that a fault happened on rectified circuit 705 or fault signal Fault_LED indicates that a fault happened on rectified circuit 704 or a fault happened on the LED, driving signal S3_Drv becomes ineffective to turn OFF switch S3. When dimming signal DIM is in the first state, driving circuit 815 is configured to turn ON and turn OFF switch S3 in accordance with control signal CTRL1. When dimming signal DIM is in the second state, driving circuit 815 is configured to keep switch S3 OFF.

Dimming circuit 814 is configured to provide dimming signal DIM in accordance with a brightness control signal DBRT and fault signal Fault_LED. When fault signal Fault_LED indicates that a fault happened on rectified circuit 705 or a fault happened on the LED, dimming signal DIM transits to the second state. One of ordinary skill in the art should appreciate that brightness control signal DBRT may be a DC signal or a pulse-width modulation (PWM) signal without detracting from the merits of the present invention.

Driving circuit 816 is configured to provide driving signal S4_Drv to switch S4 based on fault signal Fault_LED and dimming signal DIM. When fault signal Fault_LED indicates that a fault condition happened on rectified circuit 705 or the LED, or dimming signal DIM is in the second state, driving signal S4_Drv is configured to be ineffective to keep switch S4 OFF.

Figure 9:
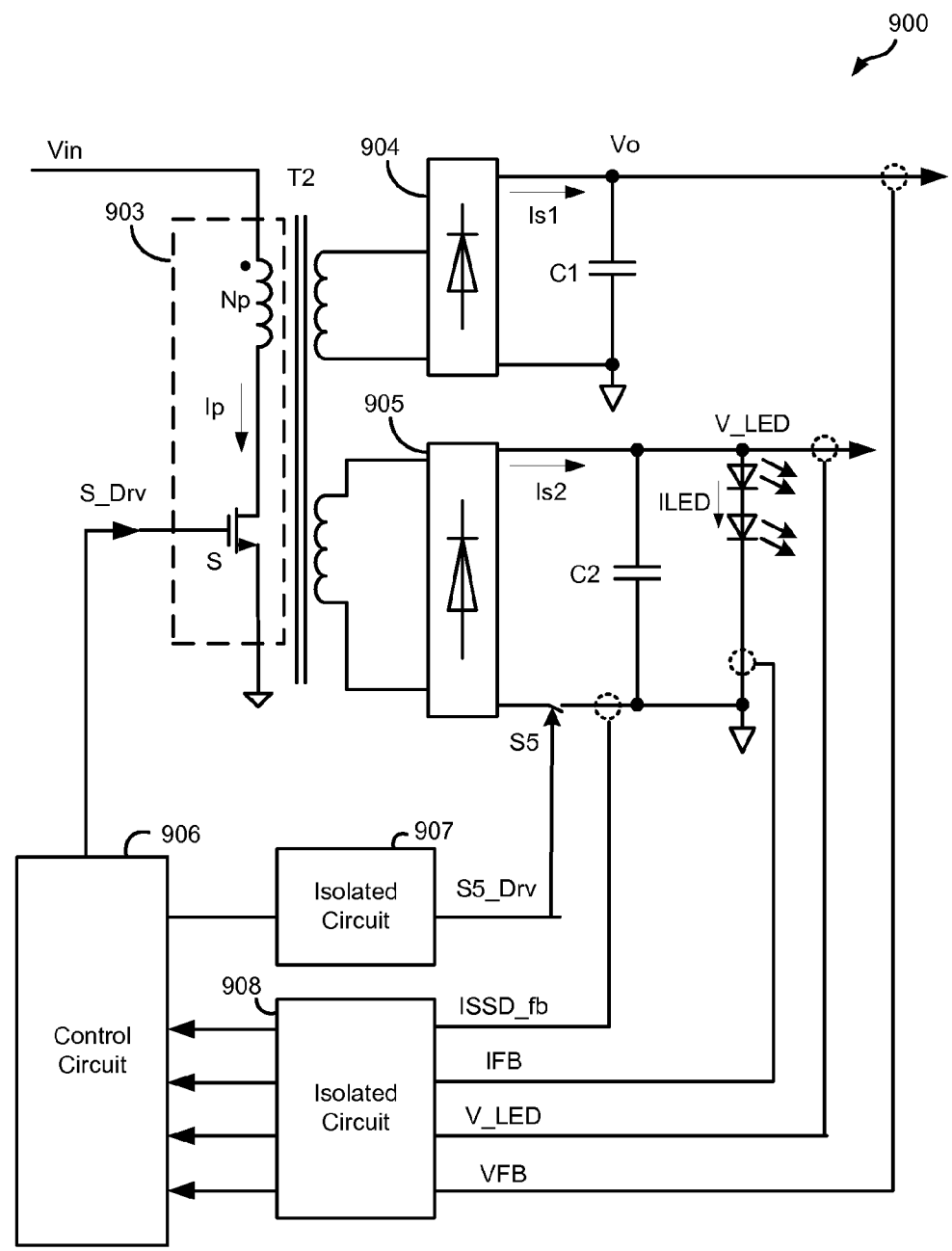
FIG. 9 schematically illustrates a LED driver system 900 according to an embodiment of the present invention.

FIG. 9 schematically illustrates a LED driver system 900 according to an embodiment of the present invention. LED driver system 900 comprises a power conversion circuit configured as a fly back topology. The power conversion circuit comprises primary circuit 903, a transformer T2, a rectified circuit 904 and a rectified circuit 905. Primary circuit 903 comprises a switch S, and primary circuit 903 is configured to receive input signal Vin, and is configured to provide an AC signal to a primary winding of transformer T2 via turning ON and turning OFF switching S. LED driver system 900 further comprises a switch S5, a control circuit 906, an isolated circuit 907 and an isolated circuit 908. Rectified circuit 904 is coupled to a first secondary winding of transformer T2 and is configured to provide voltage signal Vo as bus voltage. Rectified circuit 905 is coupled to a second secondary winding of transformer T2 and is configured to provide current signal ILED to drive the LED. Capacitor C1 is coupled between two output terminals of rectified circuit 904 and capacitor C2 is coupled between two output terminals of rectified circuit 905. Switch S5 is coupled between one output terminal of rectified circuit 905 and one terminal of capacitor C2.

Control circuit 906 is coupled to primary circuit 903 to provide driving signal S_Drv to control switch S. As shown in FIG. 9, Control circuit 906 is at a primary side of transformer T2, isolated circuit 907 and isolated circuit 908 are coupled between control circuit 906 and a secondary side of transformer T2. Control circuit 906 is configured to provide driving signal S5_dry to control switch S5 through isolated circuit 907, and control circuit 906 is configured to receive voltage feedback signal VFB, current feedback signal IFB, current feedback signal ISSD_fb and voltage V_LED through isolated circuit 908. Control circuit 906 is configured to provide driving signal S5_Drv to control switch S5 to regulate current signal ILED in accordance with current feedback signal IFB. In one embodiment, control circuit 906 is configured to provide dimming signal DIM. When dimming signal DIM is in the first state, switch S5 is turned ON and turned OFF periodically to regulate current signal ILED based on current feedback signal IFB, and when dimming signal DIM is in the second state, switch S5 is turned OFF to cut off power supplied to the LED. In one embodiment, when there is any fault happened on rectified circuit 905, switch S5 is turned OFF. Control circuit 906 may detect fault conditions of rectified circuit 905 in accordance with current feedback signal ISSD_fb and voltage feedback signal V_LED.

Figure 10:
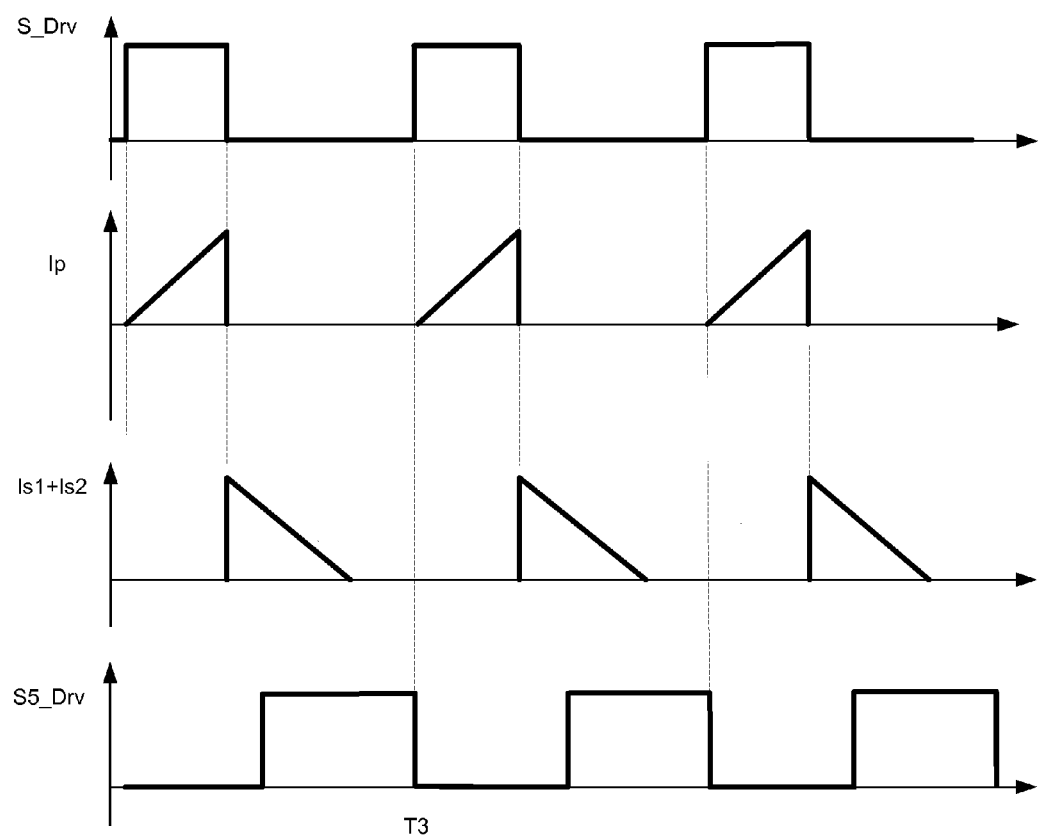
FIGS. 10-11 show waveforms of LED driver system 900 shown in FIG. 9 according to an embodiment of the present invention.
Figure 11:
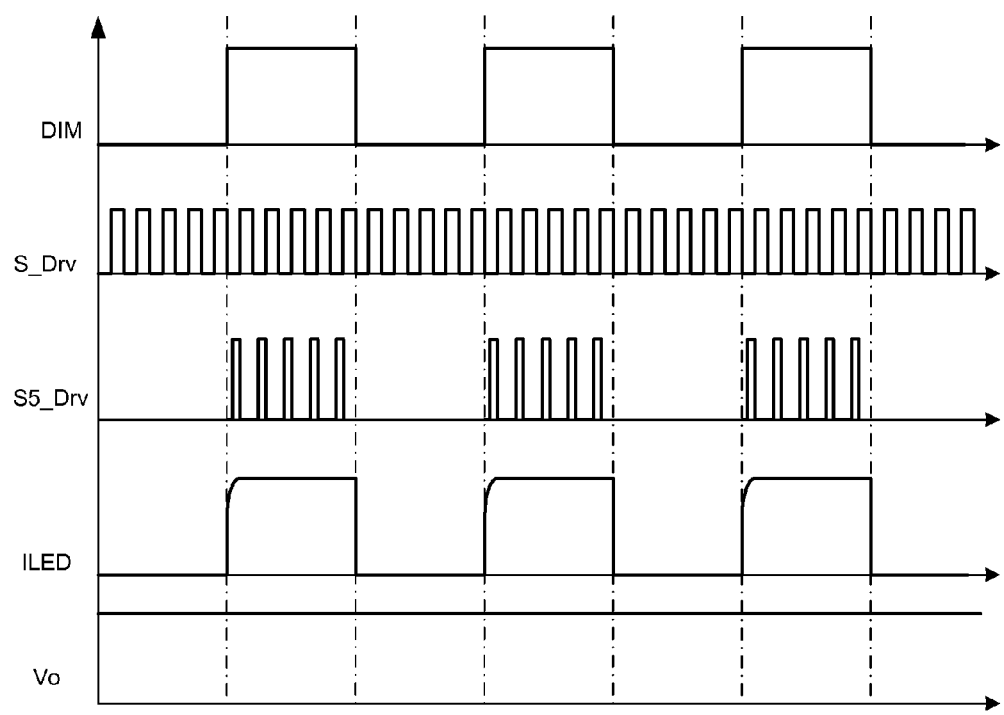

FIGS. 10-11 show waveforms of LED driver system 900 shown in FIG. 9 according to an embodiment of the present invention. Primary circuit 903 works in discontinues current mode. FIG. 10 shows driving signal S_Drv, primary current Ip, summation of secondary current Is1+Is2 and driving signal S5_Drv, wherein driving signal S_Dry and driving signal S5_Drv are high voltage level effective signals. In one embodiment, switch S5 is turned ON based on current feedback signal IFB, and switch S5 is turned OFF based on status of switch S. As shown in FIG. 10, at time T3, driving signal S_Dry becomes high voltage level, i.e., effective, to turn ON switch S, then driving signal S5_Drv becomes low voltage level to turn OFF switch S5. When switch S is turned ON at time T3, summation of secondary current Is1+Is2 is almost zero ampere, and it is easy to achieve zero-current switching off for switch S5. FIG. 11 shows dimming signal DIM, driving signal S_Drv, driving signal S5_Drv, current signal ILED and voltage signal Vo, wherein dimming signal DIM, driving signal S_Dry and driving signal S5_Drv are high voltage level effective signals. In one embodiment, when dimming signal DIM is high voltage level, switch S5 is turned ON and turned OFF periodically by driving signal S5_Dry to regulate current signal ILED. When dimming signal DIM is low voltage level, switch S5 is kept OFF by low voltage level driving signal S5_Drv. Switch S is turned ON and turned OFF by driving signal S_Dry to regulate voltage signal Vo.

Figure 12:
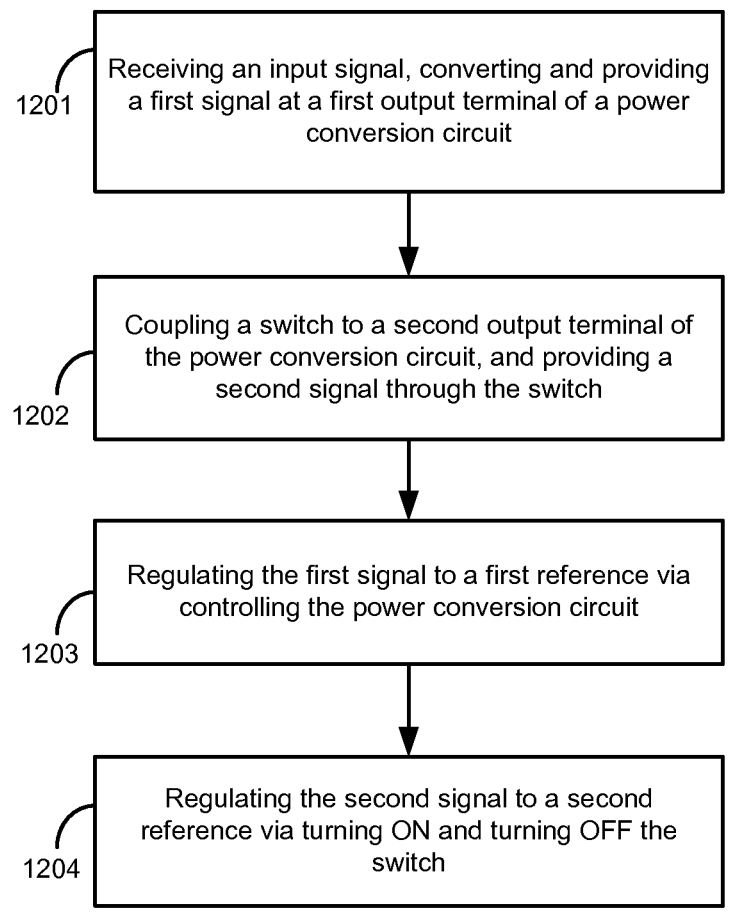
FIG. 12 shows a flow chart illustrating a control method for a light-emitting element driver system according to an embodiment of the present invention.

FIG. 12 shows a flow chart illustrating a control method for a light-emitting element driver system according to an embodiment of the present invention. The control method comprises steps 1201-1204. The light-emitting element may comprise LED, WLED or CCFL.

In step 1201, receiving an input signal, converting and providing a first signal at a first output terminal of a power conversion circuit.

In step 1202, Coupling a switch to a second output terminal of the power conversion circuit, and providing a second signal through the switch.

In step 1203, regulating the first signal to a first reference via controlling the power conversion circuit.

In step 1204, regulating the second signal to a second reference via turning ON and turning OFF the switch.

The power conversion circuit is a current type power converter. In one embodiment, the power conversion circuit comprises current type isolated power converter, such as LLC resonant converter, flyback converter, and so on. In one embodiment, the power conversion circuit comprises current type non-isolated power converter, such as BOOST converter, BUCK-BOOST converter, and so on.

In one embodiment, a dimming signal is employed to regulate an illumination of the light-emitting element. When the dimming signal is in a first state, there is a current flowing through the light-emitting element, and when the dimming signal is in a second state, there is no current flowing through the light-emitting element.

In one embodiment, the second signal is used to drive the light-emitting element. The first signal is regulated through controlling the power conversion circuit. When the dimming signal is in the first state, the switch is turned ON and turned OFF periodically to regulate the second signal. When the dimming signal is in the second state, the switch maintains OFF. The second signal may be a current flowing through the light-emitting element.

In one embodiment, the first signal is used to drive the light-emitting element. When the dimming signal is in the first state, the switch is turned ON and OFF periodically to regulate the second signal and the power conversion circuit is controlled to regulate the first signal. When the dimming signal is in the second state, the switch maintains ON and the power conversion circuit is controlled to regulate the second signal. The first signal may be the current flowing through the light-emitting element.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A light-emitting element driver system, comprising:
a power conversion circuit, configured to provide a first signal, wherein the power conversion circuit comprising:
a primary circuit, comprising a first switch, the first switch is turned ON and OFF in each switching period of the primary circuit to provide an AC signal;
a transformer, comprising a primary winding, a first secondary winding and a second secondary winding, the primary winding is coupled to the primary circuit to receive the AC signal;
a first rectified circuit, coupled to the first secondary winding and having an output terminal;
a second rectified circuit, coupled to the second secondary winding and having an output terminal configured to provide the first signal;
a second switch, having a first terminal and a second terminal, wherein the first terminal is coupled to the output terminal of the first rectified circuit and the second terminal is configured to provide a second signal; and
a control circuit, configured to provide a first control signal to control the power conversion circuit and a second control signal to control the second switch; wherein
when a dimming signal is in a first state, the first signal is regulated by turning ON and turning OFF the first switch, meanwhile the second signal is regulated by turning ON and turning OFF the second switch, and during each switching period of the primary circuit, the second switch is turned OFF in response to the turning OFF of the first switch.

2. The light-emitting element driver system of claim 1, wherein the first signal is a current signal used to drive a light-emitting element, and the second signal is a bus voltage.

3. The light-emitting element driver system of claim 2, wherein when the dimming signal is in a second state, the second switch maintains ON and the first switch is turned ON and turned OFF by the first control signal based on the second signal.

4. The light-emitting element driver system of claim 2, wherein the control circuit further comprising:
   a first compensation network, configured to provide a first compensation signal based on the first signal and a first reference signal;
   a second compensation network, configured to provide a second compensation signal based on the second signal and a second reference signal;
   a frequency control circuit, configured to receive the first compensation signal, the second compensation signal and the dimming signal, and configured to provide the first control signal to the first switch based on the first compensation signal, the second compensation signal and the dimming signal, wherein when the dimming signal is in the first state, the first control signal is configured to turn ON and turn OFF the first switch based on the first compensation signal, and when the dimming signal is in a second state, the first control signal is configured to turn ON and turn OFF the first switch based on the second compensation signal; and
   a pulse generating circuit, configured to receive the second compensation signal and the dimming signal, and configured to provide the second control signal to the second switch, wherein when the dimming signal is in the first state, the second control signal is configured to turn ON and turn OFF the second switch based on the second compensation signal, and when the dimming signal is in the second state, the second control signal is configured to maintain the second switch ON.

5. The light-emitting element driver system of claim 1, wherein the second signal is a current signal used to drive a light-emitting element, and the first signal is a bus voltage.

6. The light-emitting element driver system of claim 5, wherein when the dimming signal is in a second state, the second switch maintains OFF and the first switch is turned ON and turned OFF by the first control signal based on the first signal.

7. The light-emitting element driver system of claim 1, wherein the control circuit further comprising:
   a pulse generating circuit, configured to provide the second control signal to turn ON the second switch based on the second signal and a second reference signal; and
   a frequency control circuit, configured to provide the first control signal to turn ON and turn OFF the first switch based on the first signal and a first reference signal.

8. The light-emitting element driver system of claim 7, wherein the frequency control circuit is further configured to provide a synchronous signal to the pulse generating circuit based on the first control signal, and the pulse generating circuit is configured to turn OFF the second switch based on the synchronous signal.

9. The light-emitting element driver system of claim 7, wherein the pulse generating circuit is further configured to receive the dimming signal, wherein when the dimming signal is in a second state, the pulse generating circuit is configured to provide the second control signal to control the second switch maintaining at a status.

10. The light-emitting element driver system of claim 1, wherein the power conversion circuit is a flyback circuit, and when the dimming signal is in the first state, the second switch is turned OFF once the first switch is turned ON.

11. The light-emitting element driver system of claim 1, wherein the power conversion circuit is a LLC circuit comprising the first switch and a third switch, and when the dimming signal is in the first state, the second switch is turned OFF once either the first switch or the third switch is turned OFF.

12. A light-emitting element driver system, comprising:
   a power conversion circuit, having a primary side and a secondary side, the primary side having a first switch, and the secondary side having a first output terminal and a second output terminal, wherein the first output terminal of the secondary side is configured to provide a first signal;
   a second switch, having a first terminal and a second terminal, wherein the first terminal of the second switch is coupled to the second output terminal of the secondary side, and the second terminal of the second switch is configured to provide a second signal; and
   a control circuit, configured to provide a first control signal to control the first switch and a second control signal to control the second switch; wherein
   when a dimming signal is in a first state, the first signal is regulated by turning ON and turning OFF the first switch, meanwhile the second signal is regulated by turning ON and turning OFF the second switch, and during each switching period of the second switch, the second switch is turned OFF in response to the turning ON of the first switch.

* * * * *